US012340810B2

(12) United States Patent
Thakkar et al.

(10) Patent No.: US 12,340,810 B2
(45) Date of Patent: Jun. 24, 2025

(54) SERVER EFFICIENT ENHANCEMENT OF PRIVACY IN FEDERATED LEARNING

(71) Applicant: GOOGLE LLC, Mountain View, CA (US)

(72) Inventors: Om Thakkar, San Jose, CA (US); Abhradeep Guha Thakurta, Santa Clara, CA (US); Peter Kairouz, Seattle, WA (US); Borja de Balle Pigem, London (GB); Brendan McMahan, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 18/007,656

(22) PCT Filed: Oct. 16, 2020

(86) PCT No.: PCT/US2020/055906
§ 371 (c)(1),
(2) Date: Dec. 1, 2022

(87) PCT Pub. No.: WO2021/247066
PCT Pub. Date: Dec. 9, 2021

(65) Prior Publication Data
US 2023/0223028 A1 Jul. 13, 2023

Related U.S. Application Data

(60) Provisional application No. 63/035,559, filed on Jun. 5, 2020.

(51) Int. Cl.
*G10L 15/22* (2006.01)
*G10L 15/06* (2013.01)
*G10L 15/30* (2013.01)

(52) U.S. Cl.
CPC .......... *G10L 15/30* (2013.01); *G10L 15/063* (2013.01)

(58) Field of Classification Search
None
See application file for complete search history.

(56) References Cited

U.S. PATENT DOCUMENTS 7,596,475 B2 * 9/2009 Thiesson ................. G06F 18/29
706/14
11,062,229 B1 * 7/2021 Mnih ..................... G06N 3/045
(Continued)

FOREIGN PATENT DOCUMENTS

CN 107871160 4/2018
CN 110572253 12/2019
CN 111027715 4/2020

OTHER PUBLICATIONS

Intellectual Property India; Examination Report issued in Application No. 202227058583; 7 pages; dated Feb. 3, 2023.
(Continued)

*Primary Examiner* — Neeraj Sharma
(74) *Attorney, Agent, or Firm* — Gray Ice Higdon

(57) ABSTRACT

Techniques are disclosed that enable training a global model using gradients provided to a remote system by a set of client devices during a reporting window, where each client device randomly determines a reporting time in the reporting window to provide the gradient to the remote system. Various implementations include each client device determining a corresponding gradient by processing data using a local model stored locally at the client device, where the local model corresponds to the global model.

17 Claims, 5 Drawing Sheets

(56) References Cited

U.S. PATENT DOCUMENTS

| | | | |
|---|---|---|---|
| 11,853,391 B1* | 12/2023 | Ladkat | G06N 3/063 |
| 2016/0267380 A1* | 9/2016 | Gemello | G06N 3/084 |
| 2019/0213470 A1* | 7/2019 | Schmidt | G06N 3/084 |
| 2020/0042362 A1* | 2/2020 | Cui | G06V 10/82 |
| 2021/0174243 A1* | 6/2021 | Angel | H04L 9/083 |
| 2021/0327410 A1* | 10/2021 | Beaufays | G06F 3/04883 |
| 2021/0365358 A1* | 11/2021 | Ide | G06N 5/045 |
| 2021/0383280 A1* | 12/2021 | Shaloudegi | G06F 17/18 |
| 2023/0188319 A1* | 6/2023 | Froelicher | G06N 3/098 |
| | | | 713/189 |

OTHER PUBLICATIONS

China National Intellectual Property Administration; Notification of First Office Action issued in Application No. 202080100899.8; 20 pages; dated Jun. 29, 2024.

Erlingsson U. et al., Amplification by Shuffling: From Local to Central Differential Privacy via Anonymity; 12 pages; dated Jan. 6, 2019.

Erlingsson, U. et al., "Amplification by Shuffling: From Local to Central Differential Privacy via Anonymity;" Proceedings of the 2019 Annual ACM-SIAM Symposium on Discrete Algorithms; 12 pages; Jan. 6, 2019 Jan. 6, 2019.

Balle, B. et al., "Privacy Amplification via Random Check-Ins;" arXiv.org; arXiv:2007.06605v1; 26 pages; Jul. 13, 2020 Jul. 13, 2020.

Shokri, R. et al., "Privacy-Preserving Deep Learning;" Proceedings of the 22nd ACM SIGSAC Conference on Computer and Communications Security; 12 pages; Jan. 1, 2015 Jan. 1, 2015.

Bittau, A. et al., "PROCHLO: Strong Privacy for Analytics in the Crowd;" Cornell University; arXiv.org; arXiv:1710.00901v1; 19 pages; Oct. 2, 2017 Oct. 2, 2017.

Chen, L. et al., "Crowdlearning: Crowded Deep Learning with Data Privacy;" 15th Annual IEEE International Conference on Sensing, Communication, and Networking (SECON); 9 pages; Jun. 11, 2018 Jun. 11, 2018.

European Patent Office; International Search Report and Written Opinion of PCT/US2020/055906; 15 pages; dated Mar. 4, 2021 Mar. 4, 2021.

Abadi, M. et al., "Deep learning with differential privacy;" In Proceedings of the 2016 ACM Conference on Computer and Communications Security (CCS); 14 pages; dated Oct. 2016.

Apple, Differential Privacy Team; "Learning with Privacy at Scale;" retrieved from Internet: https://docs-assets. developer.apple.com/ ml-research/papers/learning-with-privacy-at-scale.pdf; 25 pages; dated Dec. 2017.

Augenstein, S et al., "Generative Models for Effective ML on Private, Decentralized Datasets;" Cornell University, arXiv.org; arXiv:1911.06679; 27 pages; dated Nov. 2019.

Balcer, V. et al., "Separating Local & Shuffled Differential Privacy via Histograms"; Cornell University, arXiv.org, arXiv:1911.06879; 13 pages; dated 2019.

Balle, B. et al., "Privacy Amplification by Subsampling: Tight Analyses via Couplings and Divergences"; Advances in Neural Information Processing Systems; Annual Conference on Neural Information Processing Systems (NeurIPS 2018); 11 pages; dated Dec. 2018.

Balle, B. et al., "The Privacy Blanket of the Shuffle Model"; In Advances in Cryptology-CRYPTO; 30 pages; dated 2019.

Bassily, R. et al., "Private Stochastic Convex Optimization with Optimal Rates;" Advances in Neural Information Processing Systems 32: Annual Conference on Neural Information Processing Systems (NeurIPS 2019); 10 pages; dated 2019.

Bassily, R. et al., "Private Empirical Risk Minimization: Efficient Algorithms and Tight Error Bounds;" IEEE 55th Annual Symposium on Foundations of Computer Science (FOCS); pp. 464-473; dated 2014.

Bonawitz, K. et al., "Towards Federated Learning at Scale: System Design;" Cornell University, arXiv.org, arXiv:1902.01046; 15 pages; dated 2019.

Cheu, A. et al., "Distributed Differential Privacy via Mixnets;" Cornell University, axRiv.org, arXiv:1808.01394v1; 38 pages; dated Aug. 4, 2018.

Ding, B. et al. "Collecting Telemetry Data Privately;" In Advances in Neural Information Processing Systems, Annual Conference on Neural Information Processing Systems; 10 pages; dated 2017.

Duchi, J.C. et al., "Local Privacy and Statistical Minimax Rates;" In 54th Annual IEEE Symposium on Foundations of Computer Science (FOCS); 10 pages; dated Oct. 2013.

Dwork, C. et al., "Our Data, Ourselves: Privacy Via Distributed Noise Generation;" In Advances in Cryptology-EUROCRYPT; pp. 486-503; dated 2006.

Dwork, C. et al., "Calibrating Noise to Sensitivity in Private Data Analysis;" Third Conference on Theory of Cryptography (TCC); pp. 265-284; dated 2006.

Dwork, C. et al., "The Algorithmic Foundations of Differential Privacy;" Foundations and Trends in Theoretical Computer Science, vol. 9: No. 3-4; pp. 211-407; dated 2014.

Erlingsson, U. et al., "Encode, Shuffle, Analyze Privacy Revisited: Formalizations and Empirical Evaluation;" Cornell University, arXiv. org, arXiv:2001.03618v1; dated Jan. 2020.

Erlingsson, U. et al., "RAPPOR: Randomized Aggregatable Privacy-Preserving Ordinal Response;" In Proceedings of the 2014 ACM SIGSAC Conference on Computer and Communications Security; pp. 1054-1067; dated 2014.

Feldman, V. et al., "Privacy Amplification by Iteration;" In 59th Annual IEEE Symposium on Foundations of Computer Science (FOCS); pp. 521-532; dated 2018.

Ghazi, B. et al., "Scalable and Differentially Private Distributed Aggregation in the Shuffled Model;" Cornell University, arXiv.org, arXiv:1906.08320; 17 pages; dated 2019.

Kairouz, P. et al., "Advances and Open Problems in Federated Learning;" Cornell University, arXiv.org, arXiv:1912.04977v1; 105 pages; dated 2019.

Kairouz, P. et al., "The Composition Theorem for Differential Privacy;" IEEE Transactions on Information Theory, vol. 63, Issue 6; 14 pages; dated 2017.

Kasiviswanathan, S.P. et al., "What Can We Learn Privately?"; 49th Annual IEEE Symposium on Foundations of Computer Science (FOCS); pp. 531-540; dated 2008.

Kuo, Y. et al., "Differentially Private Hierarchical Count-Of-Counts Histograms;" Proceedings of the VLDB Endowment, vol. 11, No. 11; pp. 1509-1521; dated 2018.

McMahan, H.B. et al., "Communication-Efficient Learning of Deep Networks from Decentralized Data;" In Proceedings of the 20th International Conference on Artificial Intelligence and Statistics (AISTATS); 10 pages; dated 2017.

McMahan, H.B. et al., "Learning Differentially Private Language Models Without Losing Accuracy;" Cornell University, arXiv.org, arXiv:1710.06963v1; 15 pages; dated Oct. 18, 2017.

Mitzenmacher, M et al., "Probability and Computing: Randomized Algorithms and Probabilistic Analysis;" Cambridge University Press; 487 pages, published Jan. 2005.

Pichapati, V. et al., "AdaCliP: Adaptive Clipping for Private SGD;" Cornell University, arXiv.org, arXiv:1908.07643; 19 pages; dated 2019.

Rogers, R. et al., LinkedIn's Audience Engagements API: A Privacy Preserving Data Analytics System at Scale; Cornell University, arXiv.org, arXiv:2002.05839; 28 pages; dated 2020.

Shamir, O. et al., "Stochastic Gradient Descent for Non-Smooth Optimization: Convergence Results and Optimal Averaging Schemes;" In International Conference on Machine Learning; 9 pages, dated 2013.

Smith, A. et al., "Is Interaction Necessary for Distributed Private Learning?"; IEEE Symposium on Security and Privacy; 20 pages; dated 2017.

Song, S. et al., "Stochastic Gradient Descent with Differentially Private Updates"; In IEEE Global Conference on Signal and Information Processing; pp. 245-248; dated 2013.

(56) References Cited

OTHER PUBLICATIONS

Thakkar, O. et al., "Differentially Private Learning with Adaptive Clipping"; Cornell University, arXiv.org, arXiv:1905.03871v1; 9 pages; dated May 2019.
Vitter; U.S. "Random Sampling with a Reservoir"; ACM Transactions on Mathematical Software, vol. 11, No. 1; pp. 37-57; dated Mar. 1985.
Wang, Y-X. et al., "Subsampled Renyi Differential Privacy and Analytical Moments Accountant"; Proceedings of the 22nd International Conference on Artificial Intelligence and Statistics (AISTATS); 10 pages; dated 2019.
Wang, Y-X et al., "Privacy for Free: Posterior Sampling and Stochastic Gradient Monte Carlo"; In Proceedings of the 32nd International Conference on Machine Learning, vol. 37; 10 pages; dated 2015.
Wu, X. et al., "Bolt-on Differential Privacy for Scalable Stochastic Gradient Descent-based Analytics"; In Proceedings of the 2017 ACM International Conference on Management of Data, SIGMOD; pp. 1307-1322; dated 2017.
China National Intellectual Property Administration; Notification of Second Office Action issued in Application No. 202080100899.8; 14 pages; dated Jan. 22, 2025.

\* cited by examiner

SERVER EFFICIENT ENHANCEMENT OF PRIVACY IN FEDERATED LEARNING

BACKGROUND

Data used to train a global model can be distributed across many client devices. Federated learning techniques can train a global model using this distributed data. For example, each client device can generate a gradient by processing data using a local model stored locally at the client device. The global model can be trained using these gradients without needing the data used to generate the gradients. In other words, data used to train the global model can be kept locally on-device by transmitting gradients for use in updating the global model (and not transmitting the data itself).

SUMMARY

Techniques disclosed herein are directed towards training a global model, using data generated locally at a set of client devices (e.g., gradients generated locally at each client device using a local model stored locally at each corresponding client device), where the client devices provide the update data at a response time chosen by each client device. In other words, a global model can be updated based on randomness independently generated by each individual client device participating in the training process.

In some implementations, a remote system (e.g., a server) can select the set of client devices used to update the global model. For example, the remote system can randomly (or pseudo randomly) select a set of client devices. Additionally or alternatively, the remote system can determine a reporting window in which to receive updates (e.g., gradients) from the selected client devices. The remote system can transmit the reporting window to each of the selected client devices, and each of the client devices can determine a reporting time, in the reporting window, to provide an update to the remote system. For example, a remote system can select client devices A and B from a group of client devices of A, B, C, and D for use in updating a global model. The remote system can determine a reporting window from 9:00 am to 9:15 am. Client device A can determine (e.g., randomly or pseudo randomly) a reporting time of 9:03 am in the reporting window. At 9:03 am, client device A can provide gradient A, generated by processing data using a corresponding local model stored locally at client device A, to the remote system. The remote system can use gradient A to update one or more portions of the global model. Similarly, client device B can determine (e.g., randomly or pseudo randomly) determine a reporting time of 9:10 am in the reporting window. At 9:10 am, client device B can transmit gradient B, generated by processing data using a corresponding local model stored locally at client device B, to the remote system. The remote system can use gradient B to update one or more portions of the global model.

Additionally or alternatively, in some implementations, at 9:03 am, client device A can provide gradient A', generated by processing data using the global model, to the remote system. The remote system can use gradient A' to update one or more portions of the global model. Similarly, at 9:10 am, client device B can transmit gradient B', generated by processing data using the global model, to the remote system. The remote system can use gradient B' to update one or more portions of the global model.

Additionally or alternatively, each client device selected in the set of client devices can determine whether to participate in training the global model. For example, a selected client device can determine (e.g., by a virtual coin flip) whether to participate in the round of training the global model. If the client device determines to participate, the client device can then determine a reporting time and transmit a locally generated gradient to the remote system at the reporting time. Additionally or alternatively, if the client device determines to not participate, the client device may not determine a reporting time and/or transmit a locally generated gradient to the remote system.

In some implementations, a remote system can determine a first set of client devices with a corresponding first reporting window and a second set of client devices with a corresponding second reporting window. For example, a global model can be updated using data from client devices across the world. In some implementations, the first set of client devices can be selected based on the geographical location of the client devices (e.g., client devices physically located in the same city, state, time zone, country, continent, and/or additional or alternative location based group(s) of client devices). Additionally or alternatively, the reporting window can be determined based on device availability for the corresponding physical location (e.g., a reporting window when most client devices are available but idle in the middle of the night and/or additional or alternative reporting window(s)). In some implementations, the remote system can determine the second set of client devices based on a second physical location. Similarly, the second reporting window can be determined based on device availability in the second physical location.

Accordingly, various implementations set forth techniques to ensure privacy in training a global model using decentralized data generated locally at many client devices. Classic techniques require significant server-side overhead to train a global model using decentralized data while maintaining the privacy of the data. In contrast, data privacy is orchestrated at the client device, and techniques disclosed herein require no or minimal server-side orchestration in preserving data privacy while training the global model. As such, data privacy may be enhanced while reducing server-side resource use (e.g., processor cycles, memory, power consumption, etc.).

Additionally or alternatively, client devices can randomly determine the time to transmit a locally generated gradient to the server in a reporting window. Selection of the number of client devices and the size of the reporting window can ensure the server receives gradients at a fairly constant rate. In other words, allowing the client devices to randomly select a reporting time, in a large enough reporting window, can lead to an even distribution of gradients throughout the reporting window. This even distribution of gradients can ensure network resources are not overwhelmed while training the global model. For instance, the even distribution of gradients can ensure a more even utilization of network bandwidth and may prevent spikes in bandwidth utilization which leaves the system unable to receive gradients, more even memory usage and/or processor usage which may prevent spikes leaving the system unable to (temporarily) process additional gradients, and/or a more even utilization of additional or alternative network resources. Additionally or alternatively, more even utilization of network resources will increase the number of gradients that can immediately be used to train the global model and thus may limit the number of gradients which need to be queued for later training.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
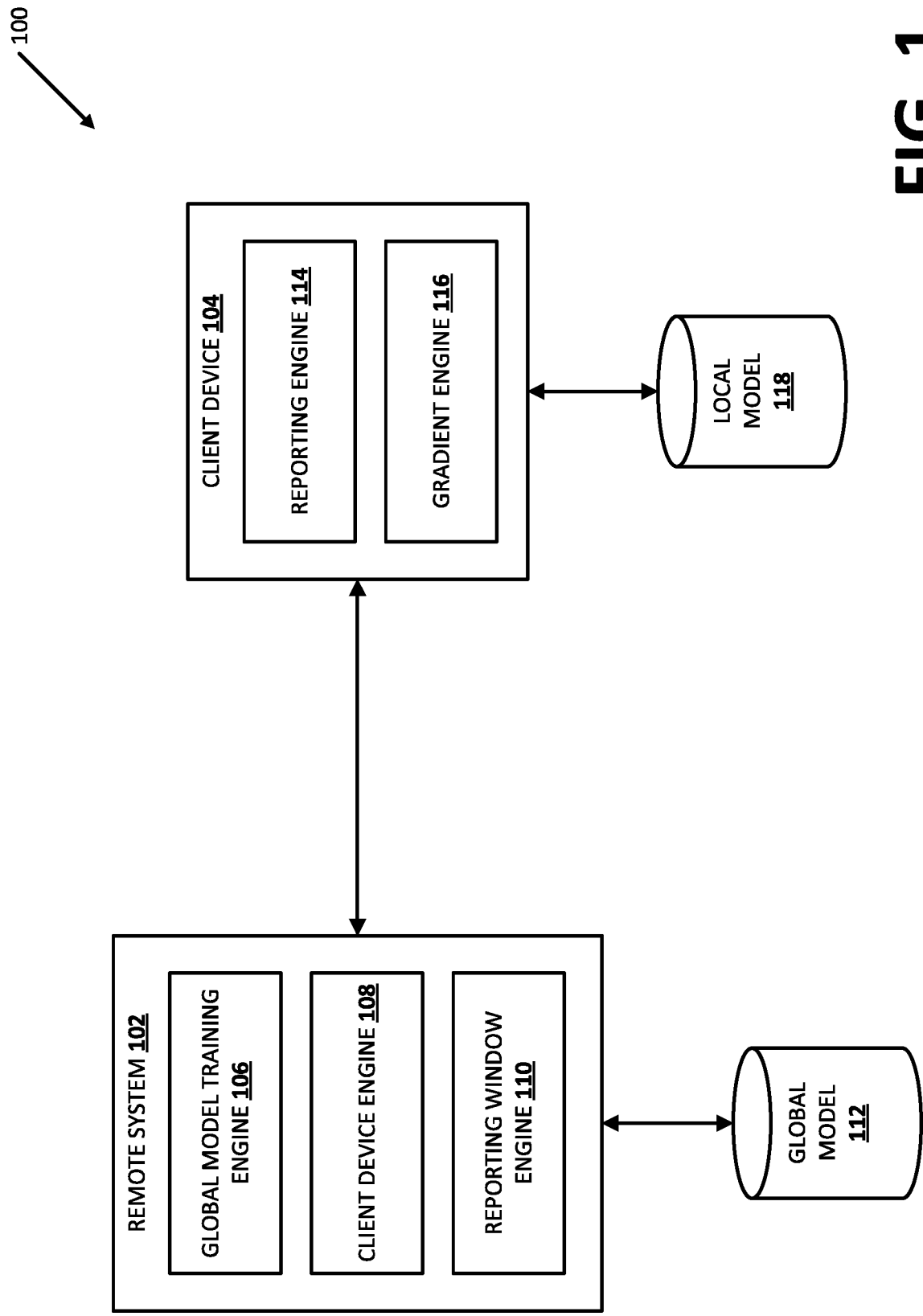
FIG. 1 illustrates an example environment in which implementations described herein may be implemented.

Differentially Private Stochastic Gradient Descent (DP-SGD) may form a fundamental building block in many applications for learning over sensitive data. Two standard approaches, privacy amplification by subsampling, and privacy amplification by shuffling, may permit adding lower noise in DP-SGD than via naïve schemes. A key assumption in both these approaches is that the elements in the data set can be uniformly sampled, or be uniformly permuted—constraints that may become prohibitive when the data is processed in a decentralized or distributed fashion.

Iterative methods, like DP-SGD, may be used in the setting of federated learning (FL) wherein the data is distributed among many devices (clients). In some implementations, the random check-in distributed protocol(s) may be utilized, which may rely only on randomized participation decisions made locally and independently by each client. Random check-ins can have privacy/accuracy trade-offs similar to privacy amplification by subsampling/shuffling. However, random check-ins may not require server-initiated communication and/or require knowledge of the population size.

Privacy amplification via random check-ins is tailored for a distributed learning framework, and can have broader applicability beyond FL. In some implementations, privacy amplification by shuffling can be extended to incorporate $(\epsilon,\delta)$-DP local randomizers, and improve its guarantees. In practical regimes, this improvement can allow for similar privacy and utility using data from an order of magnitude fewer users.

Modern mobile devices and web services can benefit significantly from large-scale machine learning, often involving training on user (client) data. When such data is sensitive, steps must be taken to ensure privacy, and a formal guarantee of differential privacy (DP) may be the gold standard.

Other privacy-enhancing techniques can be combined with DP to obtain additional benefits. For example, cross-device federated learning (FL) may allow model training while keeping client data decentralized (each participating device keeps its own local dataset, and only sends model updates or gradients to the coordinating server). However, existing approaches to combining FL and DP make a number of assumptions that may be unrealistic in real-world FL deployments.

Attempts to combine FL and DP research have been made previously. However, these works and others in the area sidestep a critical issue: the DP guarantees require very specific sampling or shuffling schemes assuming, for example, that each client participates in each iteration with a fixed probability. While possible in theory, such schemes are incompatible with the practical constraints and design goals of cross-device FL protocols; to quote a comprehensive FL survey, "such a sampling procedure is nearly impossible in practice." The fundamental challenge is that clients decide when they will be available for training and when they will check in to the server, and by design the server cannot index specific clients. In fact, it may not even know the size of the participating population.

Implementations described herein target these challenges. One goal is to provide strong central DP guarantees for the final model released by FL-like protocols, under the assumption of a trusted orchestrating server. This may be accomplished by building upon recent work on amplification by shuffling and/or combining it with new analysis techniques targeting FL-specific challenges (e.g., client-initiated communications, non-addressable global population, and constrained client availability).

Some implementations include a privacy amplification analysis specifically tailored for distributed learning frameworks. In some implementations, this may include a novel technique, called random check-in that relies on randomness independently generated by each individual client participating in the training procedure. It can be shown that distributed learning protocols based on random check-ins can attain privacy gains similar to privacy amplification by subsampling/shuffling while requiring minimal coordination from the server. While implementations disclosed herein are described with respect to distributed DP-SGD within the FL framework, it should be noted that the techniques used in are broadly applicable to any distributed iterative method.

Some implementations described herein include the use of random check-ins, a privacy amplification technique for distributed systems with minimal server-side overhead. Some implementations can include formal privacy guarantees for our protocols. Additionally or alternatively, it can be shown that random check-ins can attain similar rates of privacy amplification as subsampling and shuffling while reducing the need for server-side orchestration. Furthermore, some implementations include utility guarantees in the convex case can match the optimal privacy/accuracy trade-offs for DP-SGD in the central setting. Furthermore, as a byproduct, some implementations may improve privacy amplification by shuffling. In the case with $\epsilon_0$-DP local randomizers, the dependency of the final central DP $\epsilon$ may be improved by a factor of $O(e^{0.5\epsilon_0})$. Additionally or alternatively, implementations disclosed herein may be extend the analysis to the case with $(\epsilon_0, \delta_0)$-DP local randomizers. This improvement may be crucial in practice as it allows shuffling protocols based on a wider family of local randomizers, including Gaussian local randomizers.

To introduce the notion of privacy, neighboring data sets are defined. A pair of data sets D, D', $\in D^n$ may be referred to as neighbors if D' can be obtained from D by modifying one sample $d_i \in D$ for some $i \in [n]$.

In some implementations, differential privacy can be defined as: a randomized algorithm A: $D_n \to S$ is $(\epsilon,\delta)$—differentially private if, for any pair of neighboring data sets $D,D' \in D^n$, and for all events $S \subseteq S$ in the output range of A, we have $\Pr[A(D) \in S'] \leq e^\epsilon \cdot \Pr[A(D') \in S'] + \delta$.

For meaningful central DP guarantees (i.e., when n>1), $\epsilon$ can be assumed to be a small constant, and $\delta \ll 1/n$. The case $\delta=0$ is often referred to as pure DP (in which case, it can be written as $\epsilon$-DP). Additionally or alternatively, the term approximate DP may be used when $\delta>0$. Adaptive differentially private mechanisms can occur naturally when constructing complex DP algorithms, for e.g., DP-SGD. In addition to the dataset D, adaptive mechanisms also receive as input the output of other differentially private mechanisms. Formally, an adaptive mechanism A: $S' \times D^n \to S$ is $(\epsilon,\delta)$-DP if the mechanism $A(s', =)$ is $(\epsilon,\delta)$-DP for every $s' \in S'$. In some implementations, using n=1 gives a local randomizer, which may provide a local DP guarantee. Local randomizers can be the building blocks of local DP protocols where individuals privatize their data before sending it to an aggregator for analysis.

As an illustrative example, in some implementations, the distributed learning setup may involves n clients, where each client $j \in [n]$ can hold a data record $d^j \in D, j \in [n]$, forming a distributed data set $D = (d_1, \ldots, d_n)$. In some implementations, it can be assumed that a coordinating server wants to train the parameters $\theta \in \Theta$ of a model by using the dataset D to perform stochastic gradient descent steps according to some loss function $l: D \times \Theta \to R_+$. The server's goal is to protect the privacy of all the individuals in D by providing strong DP guarantees against an adversary that can observe the final trained model as well as all the intermediate model parameters. In some implementations, it can be assumed that the server is trusted, all devices adhere to the prescribed protocol (i.e., there are no malicious users), and all server-client communications are privileged (i.e., they cannot be detected or eavesdropped by an external adversary).

The server can start with model parameters $\theta_1$, and over a sequence of m time slots can produce a sequence of model parameters $\theta_2, \ldots, \theta_{m+1}$. The random check-ins technique can allow clients to independently decide when to offer their contributions for a model update. If and when a client's contribution is accepted by the server, she uses the current parameters $\vartheta$ and her data d to send a privatized gradient of the form $A_{ldp}(\nabla \theta^l(d, \theta))$ to the server, where $A_{ldp}$ is a DP local randomizer (e.g. performing gradient clipping and adding Gaussian noise).

The results of some implementations consider three different setups inspired by practical applications: (1) The server uses $m \ll n$ time slots, where at most one user's update is used in each slot, for a total of m/b minibatch SGD iterations. It can be assumed all n users are available for the duration of the protocol, but the server does not have enough bandwidth to process updates from every user; (2) The server uses m n/b time slots, and all n users are available for the duration of the protocol. On average, b users contribute updates to each time slot, and so, m minibatch SGD steps may be taken; (3) As with (2), but each user is only available during a small window of time relative to the duration of the protocol.

In some implementations, random check-ins for privacy amplification can be used in the context of distributed learning. Consider the distributed learning setup described in Section 2 where each client is willing to participate in the training procedure as long as their data remains private. To boost the privacy guarantees provided by the local randomizer $A_{ldp}$, clients can volunteer their updates at a random time slot of their choosing. This randomization has a similar effect on the uncertainty about the use of an individual's data on a particular update as the one provided by uniform subsampling or shuffling. Informally, random check-in can be expressed as a client in a distributed iterative learning framework randomizing their instant of participation, and determining with some probability whether to participate in the process at all.

In some implementations, random check-in can formally be defined as letting A be a distributed learning protocol with m check-in time slots. For a set $R_j \subseteq [m]$ and probability $p_j \in [0,1]$, client j performs an $(R_j, p_j)$-check-in in the protocol if with probability $p_j$ she requests the server to participate in A at time step $1 \leftarrow$ u.a.r. $R_j$, and otherwise abstains from participating. If $p_j = 1$, it can alternatively be denoted as an $R_j$-check-in.

A distributed learning protocol based on random check-ins in accordance with some implementations is presented in Algorithm 1 (below). Client j independently decides in which of the possible time steps (if any) she is willing to participate by performing an $(R_j, p_j)$-check-in. We set $R_j = [m]$ for all $j \in [n]$, and assume all n clients are available throughout the duration of the protocol. On the server side, at each time step $i \in [m]$, a random client $J_i$ among all the ones that checked-in at time i is queried: this client receives the current model $\theta_i$, locally computes a gradient update $\nabla \theta^l(d_{J_i}, \theta_i)$ using their data $d_{J_i}$, and returns to the server a privatized version of the gradient obtained using a local randomizer $A_{ldp}$. Clients checked-in at time i that are not selected do not participate in the training procedure. If at time i no client is available, the server adds a "dummy" gradient to update the model.

Algorithm 1—Distributed DP-SGD with Random Check-Ins (Fixed Window)

---

Algorithm 1 - Server-side protocol

Parameters: local randomizer $A_{ldp}: \Theta \to \Theta$, total update steps m
Initialize model $\theta_1 \in R^p$
Initialize gradient accumulator $g_1 \leftarrow 0^p$
for $i \in [m]$ do
    $S_i \leftarrow \{j: \text{User}(j) \text{ check} - \text{ins for index } i\}$
    if $S_i$ is empty then
        $\tilde{g}_i \leftarrow A_{ldp}(0^p)$     //Dummy gradient
    else
        Sample $J_i$ u. a. r. $\leftarrow S_i$
        Request User($J_i$) for update to model $\theta_i$
        Receive $\tilde{g}_i$ from User($J_i$)
    $(\theta_{i+1}, g_{i+1}) \leftarrow \text{ModeUpdate}(\theta_i, g_i + \tilde{g}_i, i)$
    Output $\theta_{i+1}$

---

Algorithm 1 - Client-side protocol for User(j)

Parameters: check-in window $R_j$, check-in probability $p_j$, loss function l, local randomizer $A_{ldp}$
Private inputs: datapoint $d_j \in D$
if a $p_j$-biased coin returns heads then
    Check-in with the server at time I u. a. r. $\leftarrow R_j$
    if receive request for update to model $\theta_I$ then
        $\tilde{g}_I \leftarrow A_{ldp}(\nabla_\theta l(d_j, \theta_I))$
        Send $\tilde{g}_I$ to server Algorithm 1 - ModelUpdate(θ, g, i)

Parameters: batch size b, learning rate η
if i mod b = 0 then
    return $\left(\theta - \frac{\eta}{b}g, 0^p\right)$     // Gradient descent step
else
    return (θ, g)     //skip update From a privacy standpoint, Algorithm 1 may share an important pattern with DP-SGD: each model update uses noisy gradients obtained from a random subset of the population. However, there are factors that can make the privacy analysis of random check-ins more challenging than the existing analysis based on subsampling and shuffling. First, unlike in the case of uniform sampling where the randomness in each update is independent, here there is a correlation induced by the fact that clients that check-in into one step cannot check-in into a different step. Second, in shuffling there is also a similar correlation between updates, but there we can ensure each update uses the same number of datapoints, while here the server does not control the number of clients that will check-in into each individual step. Nonetheless, the following result shows that random check-ins provides a factor of privacy amplification comparable to these techniques.

Theorem 3.2 (Amplification via random check-ins into a fixed window) Suppose $A_{ldp}$ is an $\varepsilon_0$-DP local randomizer. Let $A_{fix}:D^n \to \Theta^m$ be the protocol from Algorithm 1 with check-in probability $p_j = p_0$ and check-in window $R_j = [m]$ for each client $j \in [n]$. For any $\delta \in (0,1)$, algorithm $A_{fix}$ is $(\varepsilon, \delta)$-DP with $$\varepsilon = p_0(e^{\varepsilon_0} - 1)\sqrt{\frac{2e^{\varepsilon_0}\log\left(\frac{1}{\delta}\right)}{m}} + \frac{p_0^2 e^{\varepsilon_0}(e^{\varepsilon_0}-1)^2}{2m}.$$

In particular, for $\varepsilon_0 \leq 1$ and $$\delta \leq \frac{1}{100},$$

we get $$\varepsilon \leq 7p_0\varepsilon_0\sqrt{\frac{\log\left(\frac{1}{\delta}\right)}{m}}.$$

Furthermore, if $A_{ldp}$ is $(\varepsilon_0, \delta_0)$-DP with $$\delta_0 \leq \frac{(1 - e^{-\varepsilon_0})\delta_1}{4e^{\varepsilon_0}\left(2 + \frac{\ln\left(\frac{2}{\delta_1}\right)}{\ln\left(\frac{1}{1-e^{-5\varepsilon_0}}\right)}\right)},$$

then $A_{fix}$ is $(\varepsilon', \delta')$-DP with $$\varepsilon' = \frac{p_0^2 e^{8\varepsilon_0}(e^{8\varepsilon_0} - 1)^2}{2m} + p_0(e^{8\varepsilon_0} - 1)\sqrt{\frac{2e^{8\varepsilon_0}\log\left(\frac{1}{\delta}\right)}{m}} \text{ and } \delta' = \delta + m(e^{\varepsilon'} + 1)\delta_0.$$

Remark 1—In some implementations, privacy can be increased in the above statement by decreasing $p_0$. However, this may also increase the number of dummy updates, which suggests choosing $p_0 = \Theta(m/n)$. With such a choice, an amplification factor of $\sqrt{m}/n$ can be obtained. Critically, however, exact knowledge of the population size is not required to have a precise DP guarantee above.

Remark 2—At first look, the amplification factor of $\sqrt{m}/n$ may appear stronger than the typical $1/\sqrt{n}$ factor obtained via uniform subsampling/shuffling. Note that one run of random check-ins may provide m updates (as opposed to n updates via the other two methods). When the server has sufficient capacity, we can set m=n to recover a $1/\sqrt{n}$ amplification. In some implementations, one advantage of random check-ins can be benefitting from amplification in terms of the full n even if only a much smaller number of updates are actually processed. In some implementations, random check-ins may be extended to recover the $1/\sqrt{n}$ amplification even when the server is rate limited ($p_0 = m/n$), by repeating the protocol $A_{fix}$ adaptively n/m times to get the following corollary and applying advanced composition for DP.

Corollary 3.3. For algorithm $A_{fix}:D^n \to \Theta^m$ described in Theorem 3.2, suppose $A_{ldp}$ is an $\varepsilon_0$-DP local randomizer such that $$\varepsilon_0 \leq \frac{1\log\left(\frac{n}{8\sqrt{m}}\right)}{3}, \text{ and } n \geq \left(e^{\varepsilon_0}\sqrt{m}\log\left(\frac{1}{\beta}\right)\right).$$

Setting $$p_0 = \frac{m}{n},$$

and running $$\frac{n}{m}$$

repetitions of $A_{fix}$ results in total of n updates, and overall central $(\varepsilon, \delta)$-DP with $\varepsilon = \tilde{O}(e^{1.5\varepsilon_0}/\sqrt{n})$ and $\delta \in (0,1)$, where $\tilde{O}(\cdot)$ hides polylog factors in $1/\beta$ and $1/\delta$.

In some implementations, a utility analysis for random check-ins can be provided. First, a bound can be provided on the expected number of "dummy" updates during a run of the algorithm described in Theorem 3.2. The result is described below in Proposition 3.4.

Proposition 3.4 (Dummy updates in random check-ins with a fixed window). For algorithm $A_{fix}:D^n \to \Theta^m$ described in Theorem 3.2, the expected number of dummy updates performed by the server is at most $$\left(m\left(1 - \frac{p_0}{m}\right)^n\right).$$

For c>0 if $$p_0 = \frac{cm}{n},$$

we get at most $$\frac{m}{e^c}$$

expected dummy updates.

Utility for Convex ERMs—We now instantiate our amplification theorem (Theorem 3.2) in the context of differentially private empirical risk minimization (ERM). For convex ERMs, it can be shown that DP-SGD in conjunction with the privacy amplification theorem (Theorem 3.2) may be capable of achieving the optimal privacy/accuracy trade-offs.

Theorem 3.5 (Utility guarantee). Suppose in algorithm $A_{fix}:D^n \to \Theta^m$ described in Theorem 3.2 the loss $\ell:\mathcal{D} \times \Theta \to \mathbb{R}_+$ is the L-Lipschitz and convex in its second parameter and the model space $\Theta$ has dimension p and diameter R, i.e., $\sup_{\theta,\theta' \in \Theta} \|\theta - \theta'\| \leq R$.

Furthermore, let $\mathcal{D}$ be a distribution on $\mathcal{D}$, define the population risk $\mathcal{L}(\mathcal{D};\theta) = \mathbb{E}_{d \sim \mathcal{D}}[\ell(d;\theta)]$, and let $\theta^* = \operatorname{argmin}_{\theta \in \Theta} \mathcal{L}(\mathcal{D};\theta)$. If $A_{ldp}$ is a local randomizer that adds Gaussian noise with variance $\sigma^2$, and the learning rate for a model update at step $i \in [m]$ is set to be $$\eta_i = \frac{R(1 - 2e^{-np_0/m})}{\sqrt{(p\sigma^2 + L^2)i}},$$

then the output of $\theta_m$ of $A_{fix}(D)$ on a dataset D containing n i.i.d. samples from $\mathcal{D}$ satisfies $$\mathbb{E}_{D,\theta_m}[\mathcal{L}(\mathcal{D};\theta_m)] - \mathcal{L}(\mathcal{D};\theta^*) = \tilde{O}\left(\frac{\sqrt{p\sigma^2 + L^2} \cdot R}{\left(1 - 2e^{-\frac{np_0}{m}}\right)\sqrt{m}}\right).$$

In some implementations $\tilde{O}$ hides a polylog factor in m.

Remark 3—Note that as $m \to n$, it is easy to see for $$p_0 = \Omega\left(\frac{m}{n}\right)$$

that Theorem 3.5 achieves the optimal population risk trade-off.

This section presents two variants of the main protocol from the previous section. The first variant makes a better use of the updates provided by each user at the expense of a small increase in the privacy cost. The second variant allows users to check-in into a sliding window to model the case where different users might be available during different time windows.

In some implementations, variant(s) of Algorithm 1 may be utilized which, at the expense of a mild increase in the privacy cost, removes the need for dummy updates, and/or for discarding all but one of the clients checked-in at every time step. The server-side protocol of this version is given in Algorithm 2 (the client-side protocol is identical as Algorithm 1). Note that in this version, if no client checked-in at some step $i \in [m]$, the server simply skips the update. Furthermore, if at some time $i \in [m]$ multiple clients have checked in, the server requests gradients from all the clients, and performs a model update using the average of the submitted noisy gradients.

These changes may have the advantage of reducing the noise in the model coming from dummy updates, and increasing the algorithm's data efficiency by utilizing gradients provided by all available clients. The corresponding privacy analysis becomes more challenging because (1) the adversary gains information about the time steps where no clients checked-in, and (2) the server uses the potentially non-private count $|S_i|$ of clients checked-in at time i when performing the model update. Nonetheless, it may be show that the privacy guarantees of Algorithm 2 are similar to those of Algorithm 1 with an additional $O(e^{3\varepsilon_0/2})$ factor, and the restriction of non-collusion among the participating clients. For simplicity, we only analyze the case where each client has check-in probability $p_j = 1$.

---

Algorithm 2-$A_{avg}$ Server-side protocol:

---

Parameters: total update steps m
Initialize model $\theta_1 \in \mathbb{R}^p$
for $i \in [m]$ do
  $S_i \leftarrow \{j: \text{User}(j)\}$ check-ins for index i
  if $S_i$ is empty then
    $\theta_{i+1} \leftarrow \theta_i$
  else
    $\tilde{g}_i \leftarrow 0$
    for $j \in S_i$ do
      Request User(j) for update to model $\theta_i$
      Receive $\tilde{g}_{i,j}$ from User(j)
      $\tilde{g}_i \leftarrow \tilde{g}_i + \tilde{g}_{i,j}$
    $\theta_{i+1} \leftarrow \theta_i - \frac{\eta}{|S_i|}\tilde{g}_i$
Output $\theta_{i+1}$

---

Theorem 4.1 (Amplification via random check-ins with averaged updates). Suppose $A_{ldp}$ is an $\varepsilon_0$-DP local randomizer. Let $A_{avg}:D^n \to \Theta^m$ be the protocol from Algorithm 2 performing m averaged model updates with check-in probability $p_j = 1$ and check in window $R_j = [m]$ for each user $j \in [n]$. Algorithm $A_{avg}$ is $(\varepsilon, \delta + \delta_2)$-DP with $$\varepsilon = \frac{e^{4\varepsilon_0}(e^{\varepsilon_0} - 1)^2 \varepsilon_1^2}{2} + e^{2\varepsilon_0}(e^{\varepsilon_0} - 1)\varepsilon_1\sqrt{2\log(1/\delta)},$$

where $\varepsilon_1 = \sqrt{\frac{1}{n} + \frac{1}{m}} + \sqrt{\frac{\log(1/\delta_2)}{n}}$.

In particular, for $\varepsilon_0 \leq 1$ we get $$\varepsilon = O\left(\frac{\varepsilon_0}{\sqrt{m}}\right).$$

Furthermore, if $A_{ldp}$ is $(\varepsilon_0, \delta_0)$-DP with $$\delta_0 \leq \frac{(1 - e^{-\varepsilon_0})\delta_1}{4e^{\varepsilon_0}\left(2 + \frac{\ln(2/\delta_1)}{\ln(1/(1 - e^{-5\varepsilon_0}))}\right)},$$

$A_{avg}$ IS ($\varepsilon',\delta'$)-DP with $$\varepsilon' = \frac{e^{32\varepsilon_0}(e^{8\varepsilon_0}-1)^2 \varepsilon_1^2}{2} + e^{16\varepsilon_0}(e^{8\varepsilon_0}-1)\varepsilon_1 \sqrt{2\log\left(\frac{1}{\delta}\right)} \text{ and } \delta' =$$

$$\delta + \delta_2 + m(e^{\varepsilon'}+1)\delta_1.$$

We provide a utility guarantee for $A_{avg}$ in terms of the excess population risk convex ERMs (similar to Theorem 3.5).

Theorem 4.2 (Utility guarantee of Algorithm 2). Suppose an algorithm $A_{avg}:\mathcal{D}^n \to \Theta^m$ described in Theorem 4.1 the loss $\ell:\mathcal{D} \times \Theta \to \mathbb{R}_+$ is L-Lipschitz and convex in its second parameter and the model space $\Theta$ has dimension p and diameter R, $$\text{i.e., } \sup_{\theta,\theta' \in \Theta} \|\theta - \theta'\| \leq R.$$

Furthermore, let $\mathcal{D}$ be a distribution of $D$, define the population risk $\mathcal{L}(\mathcal{D};\theta) = \mathbb{E}_{d \sim \mathcal{D}}[\ell(d;\theta)]$, and let $\theta^* = \arg\min_{\theta \in \Theta} \mathcal{L}(\mathcal{D};\theta)$. If $A_{ldp}$ is a local randomizer that adds Gaussian noise with variance $\sigma^2$, and the learning rate for a model update at step $i \in [m]$ is set to be $$\eta_i = \frac{R\sqrt{n}}{\sqrt{(mp\sigma^2 + nL^2)i}},$$

then the output $\theta_m$ of $A_{avg}(D)$ on a dataset D containing n i.i.d. samples from $\mathcal{D}$ satisfies $$\mathbb{E}_{D,\theta_m}[\mathcal{L}(\mathcal{D};\theta_m)] - \mathcal{L}(\mathcal{D};\theta^*) = \tilde{O}\left(\frac{R\sqrt{mp\sigma^2 + nL^2}}{\sqrt{mn}}\right).$$

Furthermore, if the loss $\ell$ is $\beta$-smooth in its second parameter and we set the step size $$\eta_i = \frac{R\sqrt{n}}{\beta R\sqrt{n} + m\sqrt{L^2 + p\sigma^2}},$$

then we have $$\mathbb{E}_{D,\theta_1,\ldots,\theta_m}\left[\mathcal{L}\left(\mathcal{D}; \frac{1}{m}\sum_{k=1}^m \theta_i\right)\right] - \mathcal{L}(\mathcal{D};\theta^*) = \tilde{O}\left(R\sqrt{\frac{L^2 + p\sigma^2}{n}} + \frac{\beta R^2}{m}\right).$$

Comparison of the utility of Algorithm 2 to that of Algorithm 1: Recall that in $A_{fix}$ we can achieve a small fixed $\varepsilon$ by taking $p_0=m/n$ and $\sigma=\tilde{O}(p_0/\varepsilon\sqrt{m})$, in which case the excess risk bound in Theorem 3.5 becomes $$\tilde{O}\left(\sqrt{\frac{L^2}{m} + \frac{p}{\varepsilon^2 n^2}}\right).$$

On the other hand, in $A_{avg}$ we can obtain a fixed small $\varepsilon$ by taking $\sigma=\tilde{O}(1/\varepsilon\sqrt{m})$. In this case the excess risks in Theorem 4.2 are bond by $$\tilde{O}\left(\sqrt{\frac{L^2}{m} + \frac{p}{\varepsilon^2 nm}}\right)$$

in the convex case, and by $$\tilde{O}\left(\sqrt{\frac{L^2}{n} + \frac{p}{\varepsilon^2 nm}}\right) + \frac{1}{m}$$

in the convex and smooth case. Thus, we observe that all the bounds recover the optimal population risk trade-offs as $m \to n$, and for $m \ll n$ and non-smooth loss $A_{fix}$ provides a better trade-off than $A_{avg}$, while on smooth losses $A_{avg}$ and $A_{fix}$ are incomparable. Note that $A_{fix}$ (with b=1) will not attain a better bound on smooth losses because each update is based on a single data-point. Setting b>1 will reduce the number of updates to m/b for $A_{fix}$, whereas to get an excess risk bound for $A_{fix}$ for smooth losses where more than one data point is sampled at each time step will require extending the privacy analysis to incorporate the change.

The second variant we consider removes the need for all clients to be available throughout the training period. Instead, we assume that the training period comprises of n time steps, and each client $j \in [n]$ is only available during a window of m time steps. Clients perform a random check-in to provide the server with an update during their window of availability. For simplicity, we assume clients wake up in order, one every time step, so client $j \in [n]$ will perform a random check-in within the window $R_j = \{j, \ldots, j+m-1\}$. The server will perform $n-m+1$ updates starting at time m to provide a warm-up period where the first m clients perform their random check-ins.

Theorem 4.3 (Amplification via random check-ins with sliding windows). Suppose $A_{ldp}$ is an $\varepsilon_0$-DP local randomizer. Let $A_{sldw}:\mathcal{D}^n \to \Theta^{n-m+1}$ be the distributed algorithm performing n model updates with check-in probability $p_j=1$ and check-in window $R_j = \{j, \ldots, j+m-1\}$ for each user $j \in [n]$. For any $m \in [n]$, algorithm $A_{sldw}$ is ($\varepsilon, \delta$)-DP with $$\varepsilon = \frac{e^{\varepsilon_0}(e^{\varepsilon_0}-1)^2}{2m} + (e^{\varepsilon_0}-1)\sqrt{\frac{2e^{\varepsilon_0}\log(1/\delta)}{m}}.$$

For $\varepsilon_0 < 1$ and $\delta < 1/100$, we get $$\varepsilon \leq 7\varepsilon_0 \sqrt{\frac{\log(1/\delta)}{m}}.$$

Furthermore, if $A_{ldp}$ is ($\varepsilon_0,\delta_0$)-DP with $$\delta_0 \leq \frac{(1-e^{-\varepsilon_0})\delta_1}{4e^{\varepsilon_0}\left(2 + \frac{\ln(2/\delta_1)}{\ln(1/(1-e^{-5\varepsilon_0}))}\right)},$$

then $A_{sldw}$ is ($\varepsilon',\delta'$)-DP with $$\varepsilon' = \frac{e^{8\varepsilon_0}(e^{8\varepsilon_0}-1)^2}{2m} + (e^{8\varepsilon_0}-1)\sqrt{\frac{2e^{8\varepsilon_0}\log(1/\delta)}{m}} \text{ and}$$

$$\delta' = \delta + m(e^{\varepsilon'}+1)\delta_1.$$

Remark 4—We can always increase privacy in the statement above by increasing m. However, that may also increases the number of clients who do not participate in training because their scheduled check-in time is before the process begins, or after it terminates. Moreover, the number of empty slots where the server introduces dummy updates will also increase, which we would want to minimize for good accuracy. Thus, m can introduce a trade-off between accuracy and privacy.

Proposition 4.4 (Dummy updates in random check-ins with sliding windows). For algorithm $A_{sldw}:D^n \to \Theta^{n-m+1}$ described in Theorem 4.3, the expected number of dummy gradient updates performed by the server is at most (n−m+1)/e.

In some implementations, an improvement on privacy amplification can be provided by shuffling. This can be obtained by tightening the analysis of amplification by swapping, a central component in the analysis of amplification by shuffling.

Theorem 5.1 (Amplification via Shuffling). Let $A^{(i)}: S^{(1)} \times \ldots \times S^{(i-1)} \times \mathcal{D} \to S^{(i)}$, $i \in [n]$, be a sequence of adaptive $\varepsilon_0$-DP local randomizers. Let $A_{sl}:\mathcal{D}^n \to S^{(1)} \times \ldots \times S^{(n)}$ be the algorithm that given a dataset $D=(d_1, \ldots, d_n) \in \mathcal{D}^n$ samples a uniform random permutation $\pi$ over [n], sequentially computes $s_i = A^{(i)}(s_{1:i-1}, d_{\pi(i)})$ and outputs $s_{1:n}$. For any $\delta \in (0, 1)$, algorithm $A_{sl}$ satisfies $(\varepsilon, \delta)$-DP with $$\varepsilon = \frac{e^{3\varepsilon_0}(e^{\varepsilon_0}-1)^2}{2n} - e^{\frac{3\varepsilon_0}{2}}(e^{\varepsilon_0}-1)\sqrt{\frac{2\log(1/\delta)}{n}}.$$

Furthermore, if $A^{(i)}$, $i \in [n]$, is $(\varepsilon_0, \delta_0)$-DP with $$\delta_0 \le \frac{(1-e^{-\varepsilon_0})\delta_1}{4e^{\varepsilon_0}\left(2 + \frac{\ln(2/\delta_1)}{\ln(1/a - e^{-5\varepsilon_0}))}\right)},$$

then $A_{sl}$ satisfies $(\varepsilon', \delta')$-DP with $$\varepsilon' = \frac{e^{24\varepsilon_0}(e^{8\varepsilon_0}-1)^2}{2n} + e^{12\varepsilon_0}(e^{8\varepsilon_0}-1)\sqrt{\frac{2\log(1/\delta)}{n}} \text{ and } \delta' = \delta + n(e^{\varepsilon'}+1)\delta_1.$$

For comparison, the guarantee in some existing techniques in the case $\delta_0 = 0$ results in $$\varepsilon = 2e^{2\varepsilon_0}(e^{\varepsilon_0}-1)\left(e^{\frac{2\exp(2\varepsilon_0)(e^{\varepsilon_0}-1)}{n}}-1\right) + 2e^{2\varepsilon_0}(e^{\varepsilon_0}-1)\sqrt{\frac{2\log(1/\delta)}{n}}.$$

The rapid growth in connectivity and information sharing has been accelerating the adoption of tighter privacy regulations and better privacy-preserving technologies. Therefore, training machine learning models on decentralized data using mechanisms with formal guarantees of privacy is highly desirable. However, despite the rapid acceleration of research on both DP and FL, only a tiny fraction of production ML models are trained using either technology. Implementations described herein take an important step in addressing this gap.

For example, implementations disclosed herein highlight the fact that proving DP guarantees for distributed or decentralized systems can be substantially more challenging than for centralized systems, because in the distributed world it may become much harder to precisely control and characterize the randomness in the system, and this precise characterization and control of randomness is at the heart of DP guarantees. Specifically, production FL systems do not satisfy the assumptions that are typically made under state-of-the-art privacy accounting schemes, such as privacy amplification via subsampling. Without such accounting schemes, service providers cannot give DP statements with small $\varepsilon$'s. Implementations disclosed herein, though largely theoretical in nature, propose a method shaped by the practical constraints of distributed systems that allows for rigorous privacy statements under realistic assumptions.

Turning now to the figures, FIG. 1 illustrates an example environment 100 in which implementations described herein may be implemented. Example environment 100 includes remote system 102 and client device 104. Remote system 102 (e.g., a server) is remote from one or more client devices 104. In some implementations, remote system 102 may include global model training engine 106, client device engine 108, reporting window engine 110, global model 112, and/or additional or alternative engine(s) or model(s) (not depicted). In some implementations, client device 104 may include reporting engine 114, gradient engine 116, local model 118, and/or additional or alternative engine(s) or model(s) (not depicted).

In some implementations, remote system 102 may communicate with one or more client devices 104 via one or more networks such as a local area network (LAN) and/or a wide area network (WAN) (e.g., the Internet). In some implementations, client device 104 may include may include user interface input/output devices, which may include, for example, a physical keyboard, a touch screen (e.g., implementing a virtual keyboard or other textual input mechanisms), a microphone, a camera, a display screen, and/or speaker(s). The user interface input/output devices may be incorporated with one or more client devices 104 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of client device 104 may be implemented on a computing system that also contains the user interface input/output devices. In some implementations client device 104 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the client device via one or more networks such as a local area network (LAN) and/or a wide area network (WAN) (e.g., the Internet).

Some non-limiting examples of client device 104 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Client device 104 may include one or more memories for storage of data and software applications, one or more processors for accessing data and executing applications, and other components that facilitate communication over a network. The operations performed by client device 104 may be distributed across multiple computing devices. For example, computing programs running on one or more computers in one or more locations can be coupled to each other through a network.

As illustrated in FIG. 1, local model 118 can be a local model stored locally at client device 104 corresponding with global model 112. For example, global model 112 can be a global automatic speech recognition ("ASR") model used to generate a text representation of a spoken utterance, and local model 118 can be a corresponding ASR model stored locally at client device 104. Additionally or alternatively, global model 112 can be a global text prediction model used to predict one or more words while a user is typing, and local model 118 can be a corresponding local text prediction model stored locally at client device 104. Additional or alternative global and corresponding local models may be utilized in accordance with techniques described herein.

Global model training engine 106 can be used to grain global model 112. In some implementations, global model training engine 112 can process gradients received from one or more client devices 104 at a specific time step, and update one or more portions of global model 112 based on the received gradient(s). For example, in some implementations, remote system 102 can receive a gradient from a single client device at a time step. Global model training engine 106 can update one or more portions of global model 112 based on the received gradient. Additionally or alternatively, remote system 102 can receive multiple gradients from multiple client devices at a single time step (e.g., receive gradients from each of two client devices, three client devices, five client devices, 10 client devices, and/or additional or alternative number(s) of client devices). In some implementations, global model training engine 106 can select one of the received gradients (e.g., select the first received gradient, select the last received gradient, randomly (or pseudo randomly) select one of the received gradients and/or select a received gradient using one or more additional or alternative processes) for use in updating one or more portions of global model 112. Additionally or alternatively, global model training engine 106 can update one or more portions of global model 112 based on more than one of the received gradients (e.g., average the gradients received for the time step, average the first three gradients received for the time step, etc.). Furthermore, in some implementations, global model training engine 106 can update one or more portions of global model 112 based on each of the gradients received for the time step (e.g., store the received gradients in a buffer and update portion(s) of global model 112 based on each of the received gradients).

Client device engine 108 can be used to select a set of client devices 104. In some implementations, client device engine 108 can select each available client device. In some implementations, client device engine 108 can select (e.g., randomly or pseudo randomly select) a set of the client devices (e.g., select a set of client devices from the available client devices). Additionally or alternatively, client device engine 108 can select a subset of the client devices based on the physical location of the devices, based on historic data indicating device availability, and/or based on additional or alternative characteristics of the device(s). In some implementations, client device engine 108 can determine the number of client device(s) selected (e.g., client device engine 108 can randomly or pseudo randomly determine the number of client devices to be selected). In some implementations, client device engine 108 can determine multiple sets of client devices. For example, client device engine 108 can determine two sets of client devices, three sets of client devices, five sets of client devices, ten sets of client devices, one hundred sets of client devices, and/or additional or alternative numbers of sets of client devices.

Reporting window engine 110, of remote system 102, can be used to determine the time frame for each selected client device to update remote system 102. For example, reporting window engine 110 can determine the size of the reporting window based on the number of client devices selected by client device engine 108 (select a reporting window size sufficiently large enough for the selected number of client devices). Additionally or alternatively, the reporting window can be selected based on historical data indicating when the selected client devices are in communication with the remote system but are otherwise idle. For example, reporting window engine 110 can select a reporting window in the middle of the night when devices are more likely to be idle.

In some implementations, reporting engine 114 of client device 104 can determine whether to provide a gradient to remote system 102 for use in updating global model 112 and/or determine a reporting time within a reporting window (e.g., a reporting window generated using reporting window engine 110) to provide the gradient. For example, reporting engine 114 can make a determination of whether to participate in the current round of training (e.g., randomly determining whether to participate or not). If reporting engine 114 determines to participate, reporting engine 114 can then randomly determine a reporting time in the reporting window for client device 104 to provide a gradient to the remote system 102. Conversely, if reporting engine 114 determines to not participate in the training, a reporting time may not be selected from the reporting window and/or a gradient may not be transmitted to remote system 102 in the reporting window.

In some implementations, gradient engine 116 can be used to generate a gradient to provide to remote system 102 for use in updating global model 112. In some implementations, gradient engine 116 can process data generated locally at client device 104, using local model 118, to generate output. Additionally or alternatively, gradient engine 116 can generate the gradient based on the generated output in a supervised and/or in an unsupervised manner. For example, global model 112 and local model 118 can be a global ASR model and a corresponding local ASR model respectively. Audio data capturing a spoken utterance, captured using a microphone of client device 104, can be processed using the local ASR model to generate a candidate text representation of the spoken utterance. In some implementations, client device 104 can prompt the user who spoke the utterance asking if the candidate text representation correctly captures the spoken utterance and if not, for the user to correct the text representation. The gradient can be determined based on the difference between the candidate text representation of the spoken utterance and the corrected text representation of the spoken utterance. As another example, global model 112 and local model 118 may be predictive text models used to predict text based on user provided input (e.g., used to predict the next word(s) while a user is typing). In some implementations, current text can be processed using the predictive text model to generate the candidate next text. The system can determine whether the next text typed by the user matches the candidate next text. In some implementations, the gradient can be determined based on the difference between the next text typed by the user and the candidate next text. Additional or alternative techniques may be used by gradient engine 116 to generate a gradient at client device 104.

Figure 2:
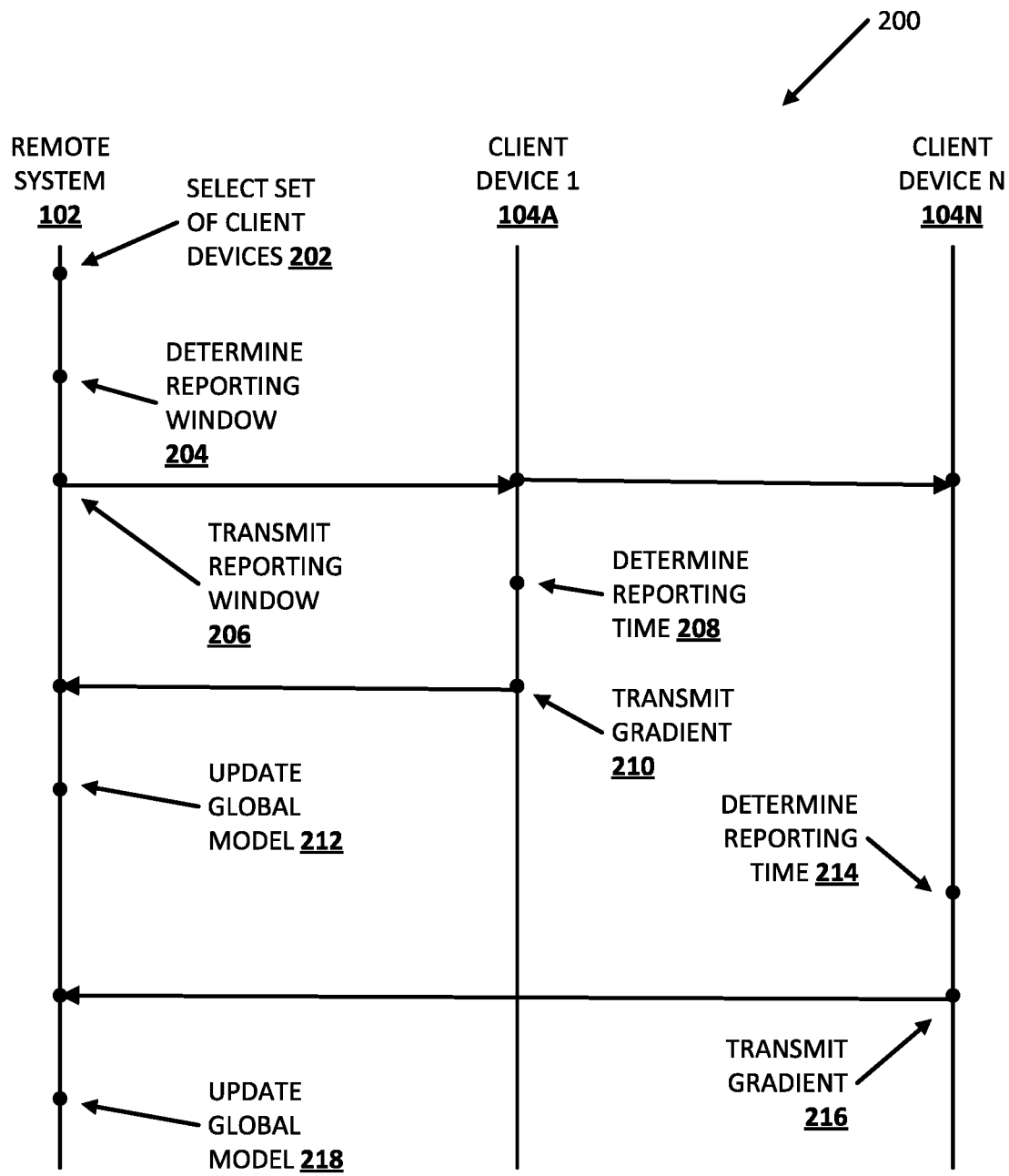
FIG. 2 illustrates an example of training a global model in accordance with various implementations described herein.

FIG. 2 illustrates an example 200 updating a global model in accordance with implementations disclosed herein. In the illustrated example, at step 202, remote system 102 can select a set of client devices including client device A 104A and client device N 104N. In some implementations, remote system 102 can select the set of client devices using client device engine 108 of FIG. 1. A step 204, remote system 102 can determine a reporting window indicating a timeframe for client devices A and N to provide updates for the global model. In some implementations, remote system 102 can determine the reporting window using reporting window engine 110 of FIG. 1. Additionally or alternatively, at step 206, remote system 102 can transmit the reporting widow to client device A 104A and client device N 104N.

At step 208, client device A 104A can determine a reporting time, in the reporting window received from remote system 102. In some implementations, client device A 104A can determine the reporting time using reporting engine 114 of FIG. 1. At step 210, client device A 104A can transmit gradient A to remote system 102. In some implementations, client device A 104A can determine gradient A using gradient engine 116. For example, gradient A can be generated by processing data using a local model, stored locally at client device A, corresponding with the global model. At step 212, remote system 102 can update one or more portions of the global model using gradient A received from client device A 104A. In some implementations, remote system 102 can update global model 112 using gradient A using global model training engine 106 of FIG. 1.

Similarly, at step 214, client device N 104N can determine a reporting time, in the reporting window received from remote system 102. In some implementations, client device N 104N can determine the reporting time using reporting engine 114 of FIG. 1. At step 216, client device N 104N can transmit gradient N to remote system 102. In some implementations, client device N 104N can determine gradient N using gradient engine 116. For example, gradient N can be generated by processing data using a local model, stored locally at client device N, corresponding with the global model. At step 218, remote system 102 can update one or more portions of the global model using gradient N received from client device N 104N. In some implementations, remote system 102 can update global model 112 using gradient N using global model training engine 106 of FIG. 1.

FIG. 2 is merely an illustrative example and is not meant to be limiting. For instance, remote system 102 can receive gradients from additional or alternative client device(s), the client devices can determine reporting times in the same step (e.g., client device A determines its corresponding reporting time while client device N is determining its corresponding reporting time), multiple devices can select the same reporting time, etc.

Figure 3:
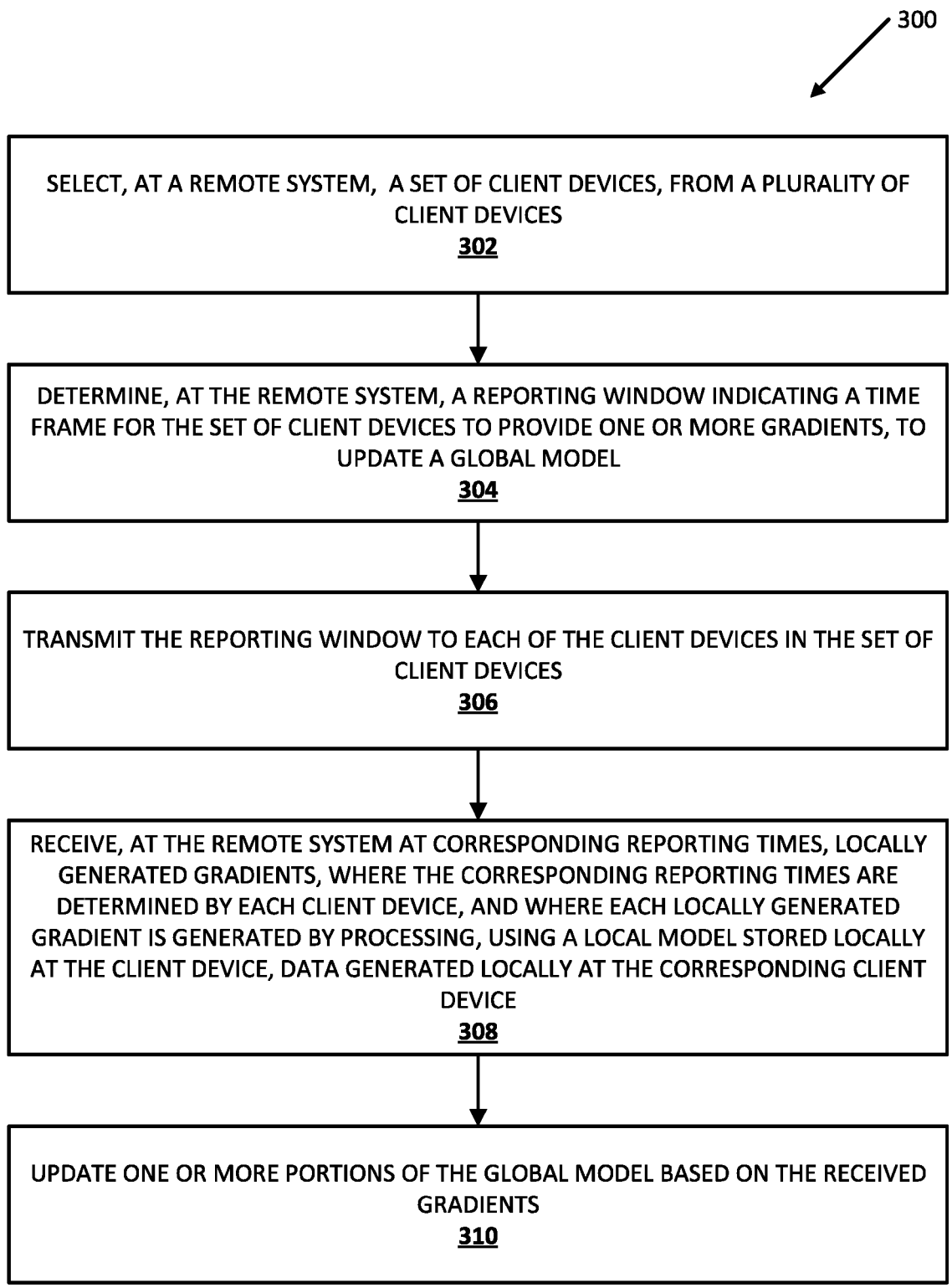
FIG. 3 is a flowchart illustrating an example process of training a global model at a remote system in accordance with various implementations disclosed herein.

FIG. 3 is a flowchart illustrating a process 300 of training a global model using a remote system in accordance with implementations disclosed herein. For convenience, the operations of the flowchart are described with reference to a system that performs the operations. This system may include various components of various computer systems, such as one or more components remote system 102, client device 104, and/or computing system 510. Moreover, while operations of process 300 are shown in a particular order, this is not meant to be limiting. One or more operations may be reordered, omitted, and/or added.

At block 302, the system selects, at the remote system, the set of client devices, from a plurality of client devices. In some implementations, the system can select the set of client devices using client device engine 108 of FIG. 1. Additionally or alternatively, in some implementations, the system can select multiple sets of client devices.

At block 304, the system determines, at the remote system, a reporting window indicating a time frame for the set of client devices to provide one or more gradients, to update a global model. In some implementations, the system can determine the reporting window using reporting window engine 110 of FIG. 1.

At block 306, the system transmits the reporting window to each of the client devices in the selected set of client devices.

At block 308, the system receives, at the remote system and at corresponding reporting times, locally generated gradients. In some implementations the corresponding reporting times can be determined, by each client device, in the reporting window. In some implementations, each locally generated gradient can be generated by processing, using a local model stored locally at the corresponding client device, data generated locally at the corresponding client device. In some implementations, each client device can transmit the corresponding gradient to the remote system in accordance with process 400 of FIG. 1 described herein.

At block 310, the system updates one or more portions of the global model based on the received gradients.

Figure 4:
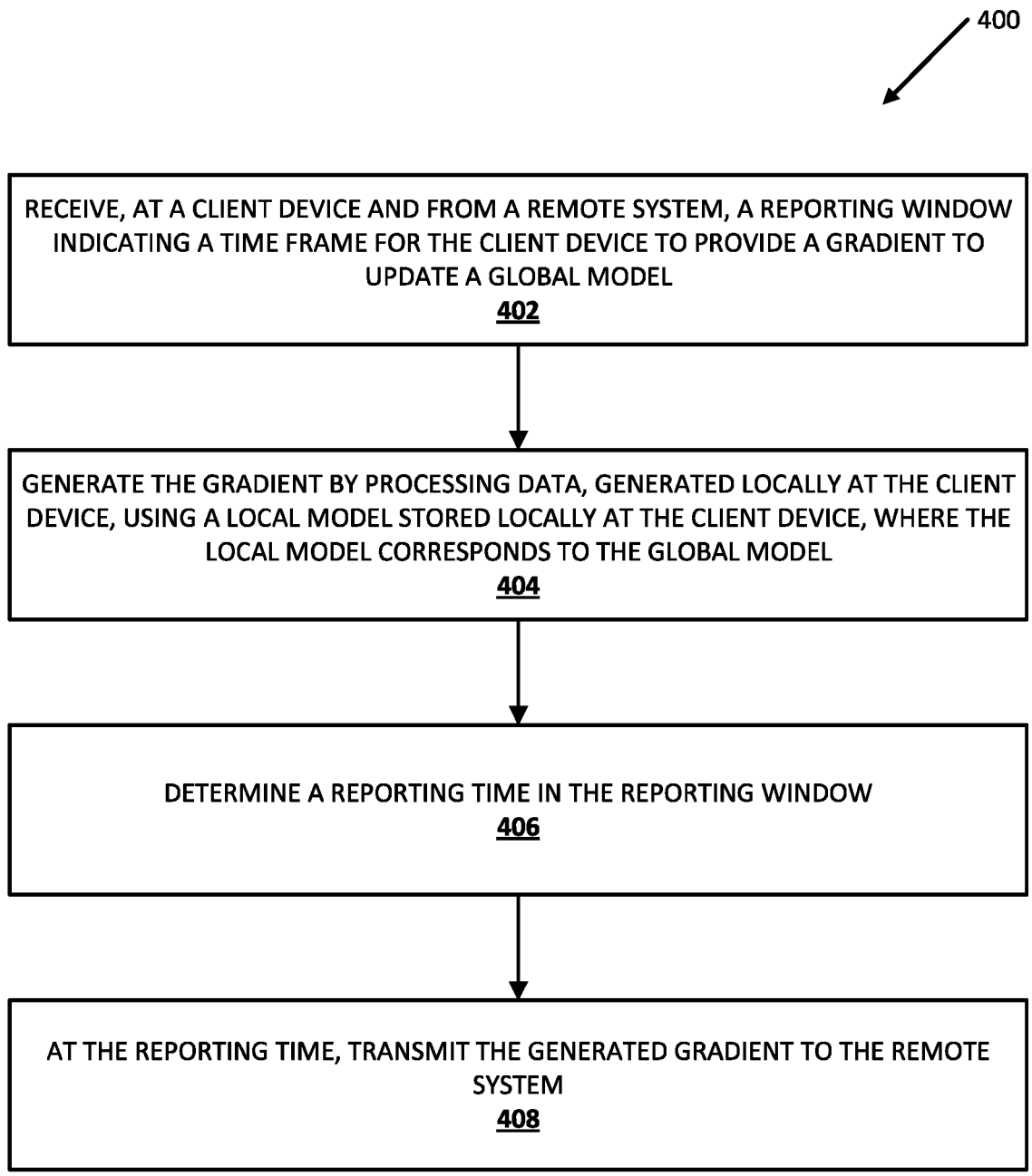
FIG. 4 is a flowchart illustrating an example process of transmitting a gradient from a client device to a remote system in accordance with various implementations disclosed herein.

FIG. 4 is a flowchart illustrating a process 400 of transmitting a gradient, from a client device to a remote system, for use in updating a global model in accordance with implementations disclosed herein. For convenience, the operations of the flowchart are described with reference to a system that performs the operations. This system may include various components of various computer systems, such as one or more components remote system 102, client device 104, and/or computing system 510. Moreover, while operations of process 400 are shown in a particular order, this is not meant to be limiting. One or more operations may be reordered, omitted, and/or added.

At block 402, the system receives, at a client device from a remote system, a reporting window indicating a time frame for the client device to provide a gradient to update a global model.

At block 404, the system generates the gradient by processing data, generated locally at the client device, using a local model stored locally at the client device, where the local model corresponds to the global model. In some implementations, the system can generate the gradient using gradient engine 116 of FIG. 1.

At block 406, the system determines a reporting time in the reporting window. In some implementations, the system can randomly (or pseudo randomly) select a reporting time in the reporting window. In some implementations, the system can determine the reporting time using reporting engine 114 of FIG. 1.

At block 408, the system transmits, at the reporting time, the generated gradient to the remote system.

Figure 5:
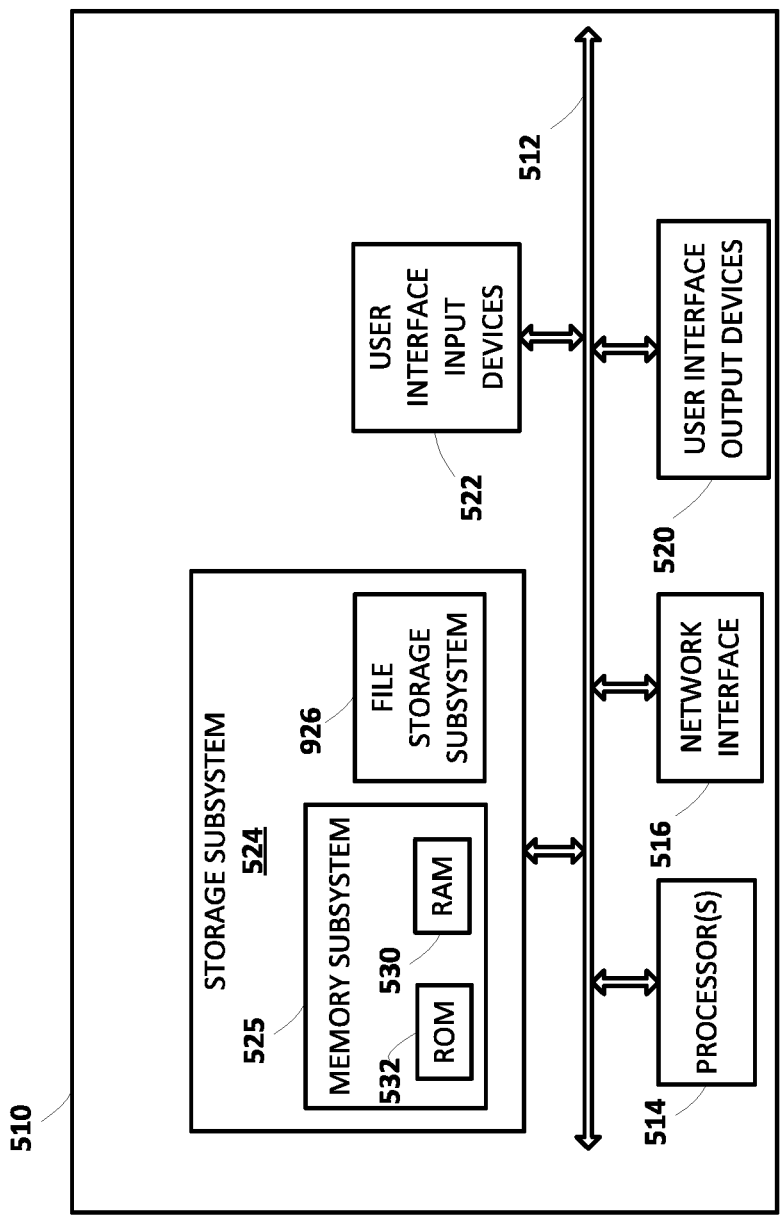
FIG. 5 schematically depicts an example architecture of a computer system.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the processes of FIGS. 3, 4, and/or other processes described herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes selecting, at a remote system, a set of client devices, from a plurality of client devices. In some implementations, the method includes determining, at the remote system, a reporting window indicating a time frame for the set of client devices to provide one or more gradients, to update a global model. In some implementations, the method includes transmitting, by the remote system, to each client device in the set of client devices, the reporting window, wherein transmitting the reporting window causes each of the client devices to at least selectively determine a corresponding reporting time, within the reporting window, for transmitting a corresponding locally generated gradient to the remote system. In some implementations, the method includes receiving, in the reporting window, the corresponding locally generated gradients at the corresponding reporting times, wherein each of the corresponding locally generated gradients is generated by a corresponding one of the client devices based on processing, using a local model stored locally at the client device, data generated locally at the client device to generate a predicted output of the local model. In some implementations, the method includes updating one or more portions of the global model, based on the received gradients.

These and other implementations of the technology can include one or more of the following features.

In some implementations, the method further includes selecting, at the remote system, an additional set of additional client devices, from the plurality of client devices. In some implementations, the method further includes determining, at the remote system, an additional reporting window indicating an additional time frame for the additional set of additional client devices to provide one or more additional gradients, to update the global model. In some implementations, the method further includes transmitting, by the remote system, to each additional client device in the additional set of additional client devices, the additional reporting window, wherein transmitting the additional reporting window causes each of the additional client devices to at least selectively determine a corresponding additional reporting time, within the additional reporting window, for transmitting a corresponding additional locally generated gradient to the remote system. In some implementations, the method further includes receiving, in the additional reporting window, the corresponding additional locally generated gradients at the corresponding additional reporting times, wherein each of the corresponding additional locally generated gradients is generated by a corresponding one of the additional client devices based on processing, using a local model stored locally at the additional client device, additional data generated locally at the additional client device to generate an additional predicted output of the local model. In some implementations, the method further includes updating one or more additional portions of the global model, based on the received additional gradients. In some versions of those implementations, at least one client device in the set of client devices, is in the additional set of additional client devices.

In some implementations, processing, using the local model stored locally at the client device, data generated locally at the client device to generate the predicted output of the local model further includes generating the gradient based on the predicted output of the local model and ground truth data generated by the client device. In some versions of those implementations, the global model is a global automatic speech recognition ("ASR") model, the local model is a local ASR model, and wherein generating the gradient based on the predicted output of the local model includes processing audio data capturing a spoken utterance using the local ASR model to generate a predicted text representation of the spoken utterance. In some versions of those implementations, the method further includes generating the gradient based on the predicted text representation of the spoken utterance and a ground truth representation of the spoken utterance generated by the client device.

In some implementations, each of the client devices at least selectively determining the corresponding reporting time, within the reporting window, for transmitting the corresponding locally generated gradient to the remote system includes, for each of the client devices, randomly determining the corresponding reporting time, within the reporting window, for transmitting the corresponding locally generated gradient to the remote system. In some versions of those implementations, each of the client devices at least selectively determining the corresponding reporting time, within the reporting window, for transmitting the corresponding locally generated gradient to the remote system includes, for each of the client devices, determining whether to transmit the corresponding locally generated gradient to the remote system. In some versions of those implementations, in response to determining to transmit the corresponding locally generated gradient, the method further includes transmitting corresponding locally generated gradient to the remote system. In some versions of those implementations, determining whether to transmit the corresponding locally generated gradient to the remote system includes randomly determining whether to transmit the corresponding locally generated gradient to the remote system.

In some implementations, receiving, in the reporting window, the corresponding locally generated gradients at the corresponding reporting times includes receiving a plurality of corresponding locally generated gradients at the same reporting time. In some versions of those implementations, updating one or more portions of the global model, based on the received gradients includes determining an update gradient based on the plurality of corresponding locally generated gradients received at the same reporting time. In some versions of those implementations, the method further includes updating the one or more portions of the global model, based on the update gradient. In some versions of those implementations, determining the update gradient based on the plurality of corresponding locally generated gradients, received at the same reporting time, includes selecting the update gradient from the plurality of corresponding locally generated gradients received at the same reporting time. In some versions of those implementations, selecting the update gradient from the plurality of corresponding locally generated gradients, received at the same reporting time, includes randomly selecting the update gradient from the plurality of corresponding locally generated gradients, received at the same reporting time. In some versions of those implementations, determining the update gradient based on the plurality of corresponding locally generated gradients, received at the same reporting time, includes determining the update gradient based on an average of the plurality of corresponding locally generated gradients.

In some implementations, a method implemented by one or more processors is provided, the method includes receiving, at a client device and from a remote system, a reporting window indicating a time frame for the client device to provide a gradient, to the remote system, to update one or more portions of a global model. In some implementations, the method includes processing locally generated data, using a local model, to generate predicted output of the local model. In some implementations, the method includes generating the gradient based on the predicted output of the local model. In some implementations, the method includes determining a reporting time, in the reporting window, to transmit the gradient to the remote server. In some implementations, the method includes, at the reporting time, transmitting the gradient to the remote server.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    selecting, at a remote system, a set of client devices, from a plurality of client devices;
    determining, at the remote system, a reporting window indicating a time frame for the set of client devices to provide one or more gradients, to update a global model;
    transmitting, by the remote system, to each client device in the set of client devices, the reporting window, wherein transmitting the reporting window causes each of the client devices to at least selectively determine a corresponding reporting time, within the reporting window, for transmitting a corresponding locally generated gradient to the remote system;
    receiving, in the reporting window, the corresponding locally generated gradients at the corresponding reporting times, wherein each of the corresponding locally generated gradients is generated by a corresponding one of the client devices based on processing, using a local model stored locally at the client device, data generated locally at the client device to generate a predicted output of the local model;

updating one or more portions of the global model, based on the received gradients;

selecting, at the remote system, an additional set of additional client devices, from the plurality of client devices;

determining, at the remote system, an additional reporting window indicating an additional time frame for the additional set of additional client devices to provide one or more additional gradients, to update the global model;

transmitting, by the remote system, to each additional client device in the additional set of additional client devices, the additional reporting window, wherein transmitting the additional reporting window causes each of the additional client devices to at least selectively determine a corresponding additional reporting time, within the additional reporting window, for transmitting a corresponding additional locally generated gradient to the remote system;

receiving, in the additional reporting window, the corresponding additional locally generated gradients at the corresponding additional reporting times, wherein each of the corresponding additional locally generated gradients is generated by a corresponding one of the additional client devices based on processing, using a local model stored locally at the additional client device, additional data generated locally at the additional client device to generate an additional predicted output of the local model; and updating one or more additional portions of the global model, based on the received additional gradients.

2. The method of claim 1, wherein processing, using the local model stored locally at the client device, data generated locally at the client device to generate the predicted output of the local model further comprises:

generating the gradient based on the predicted output of the local model and ground truth data generated by the client device.

3. The method of claim 2, wherein the global model is a global automatic speech recognition ("ASR") model, the local model is a local ASR model, and wherein generating the gradient based on the predicted output of the local model comprises:

processing audio data capturing a spoken utterance using the local ASR model to generate a predicted text representation of the spoken utterance; and generating the gradient based on the predicted text representation of the spoken utterance and a ground truth representation of the spoken utterance generated by the client device.

4. The method of claim 3, wherein each of the client devices at least selectively determining the corresponding reporting time, within the reporting window, for transmitting the corresponding locally generated gradient to the remote system comprises:

for each of the client devices, randomly determining the corresponding reporting time, within the reporting window, for transmitting the corresponding locally generated gradient to the remote system.

5. The method of claim 4, wherein each of the client devices at least selectively determining the corresponding reporting time, within the reporting window, for transmitting the corresponding locally generated gradient to the remote system comprises:

for each of the client devices:
determining whether to transmit the corresponding locally generated gradient to the remote system; and in response to determining to transmit the corresponding locally generated gradient, transmitting the corresponding locally generated gradient to the remote system.

6. The method of claim 5, wherein determining whether to transmit the corresponding locally generated gradient to the remote system comprises:

randomly determining whether to transmit the corresponding locally generated gradient to the remote system.

7. The method of claim 1, wherein at least one client device in the set of client devices, is in the additional set of additional client devices.

8. The method of claim 1, wherein receiving, in the reporting window, the corresponding locally generated gradients at the corresponding reporting times comprises receiving a plurality of corresponding locally generated gradients at the same reporting time.

9. The method of claim 8, wherein updating one or more portions of the global model, based on the received gradients comprises:

determining an update gradient based on the plurality of corresponding locally generated gradients received at the same reporting time; and updating the one or more portions of the global model, based on the update gradient.

10. The method of claim 9, wherein determining the update gradient based on the plurality of corresponding locally generated gradients, received at the same reporting time, comprises:

selecting the update gradient from the plurality of corresponding locally generated gradients received at the same reporting time.

11. The method of claim 10, wherein selecting the update gradient from the plurality of corresponding locally generated gradients, received at the same reporting time, comprises:

randomly selecting the update gradient from the plurality of corresponding locally generated gradients, received at the same reporting time.

12. The method of claim 9, wherein determining the update gradient based on the plurality of corresponding locally generated gradients, received at the same reporting time, comprises:

determining the update gradient based on an average of the plurality of corresponding locally generated gradients.

13. A method implemented by one or more processors, the method comprising:

selecting, at a remote system, a set of client devices, from a plurality of client devices;

determining, at the remote system, a reporting window indicating a time frame for the set of client devices to provide one or more gradients, to update a global model;

transmitting, by the remote system, to each client device in the set of client devices, the reporting window, wherein transmitting the reporting window causes each of the client devices to at least selectively determine a corresponding reporting time, within the reporting window, for transmitting a corresponding locally generated gradient to the remote system;

receiving, in the reporting window, the corresponding locally generated gradients at the corresponding reporting times, wherein each of the corresponding locally generated gradients is generated by a corresponding one of the client devices based on processing, using a local model stored locally at the client device, data generated locally at the client device to generate a predicted output of the local model,
wherein receiving, in the reporting window, the corresponding locally generated gradients at the corresponding reporting times comprises receiving a plurality of corresponding locally generated gradients at the same reporting time; and
updating one or more portions of the global model, based on the received gradients, wherein updating one or more portions of the global model, based on the received gradients comprises:
determining an update gradient based on the plurality of corresponding locally generated gradients received at the same reporting time; and
updating the one or more portions of the global model, based on the update gradient.

14. The method of claim 13, wherein determining the update gradient based on the plurality of corresponding locally generated gradients, received at the same reporting time, comprises:
selecting the update gradient from the plurality of corresponding locally generated gradients received at the same reporting time.

15. The method of claim 14, wherein selecting the update gradient from the plurality of corresponding locally generated gradients, received at the same reporting time, comprises:
randomly selecting the update gradient from the plurality of corresponding locally generated gradients, received at the same reporting time.

16. The method of claim 13, wherein determining the update gradient based on the plurality of corresponding locally generated gradients, received at the same reporting time, comprises:
determining the update gradient based on an average of the plurality of corresponding locally generated gradients.

17. A remote system comprising:
memory storing instructions; and
one or more processors operable to execute the instructions to:
select a set of client devices from a plurality of client devices;
determine a reporting window indicating a time frame for the set of client devices to provide one or more gradients, to update a global model;
transmit, to each client device in the set of client devices, the reporting window, wherein transmitting the reporting window causes each of the client devices to at least selectively determine a corresponding reporting time, within the reporting window, for transmitting a corresponding locally generated gradient to the remote system;
receive, in the reporting window, the corresponding locally generated gradients at the corresponding reporting times, wherein each of the corresponding locally generated gradients is generated by a corresponding one of the client devices based on processing, using a local model stored locally at the client device, data generated locally at the client device to generate a predicted output of the local model;
update one or more portions of the global model, based on the received gradients;
select an additional set of additional client devices, from the plurality of client devices;
determine an additional reporting window indicating an additional time frame for the additional set of additional client devices to provide one or more additional gradients, to update the global model;
transmit to each additional client device in the additional set of additional client devices, the additional reporting window, wherein transmitting the additional reporting window causes each of the additional client devices to at least selectively determine a corresponding additional reporting time, within the additional reporting window, for transmitting a corresponding additional locally generated gradient to the remote system;
receive, in the additional reporting window, the corresponding additional locally generated gradients at the corresponding additional reporting times, wherein each of the corresponding additional locally generated gradients is generated by a corresponding one of the additional client devices based on processing, using a local model stored locally at the additional client device, additional data generated locally at the additional client device to generate an additional predicted output of the local model; and
update one or more additional portions of the global model, based on the received additional gradients.

\* \* \* \* \*